May 11, 1965   F. C. JOHNSTON ETAL   3,182,381
METHOD OF FORMING APERTURED HOLLOW INSULATED BUSBARS
Original Filed May 26, 1958   3 Sheets-Sheet 1
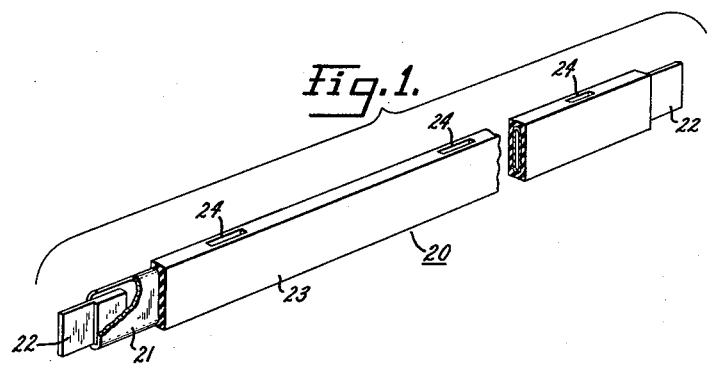
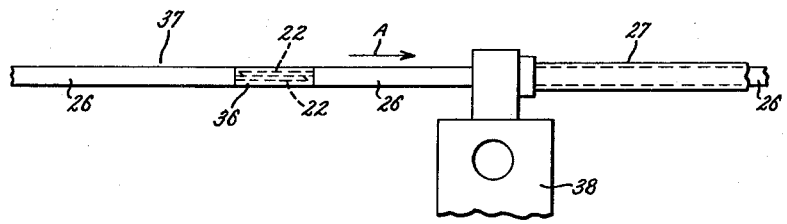
INVENTORS:
FRANK C. JOHNSTON,
PAUL KRAUSS,
BY David M. Schiller
ATTORNEY.

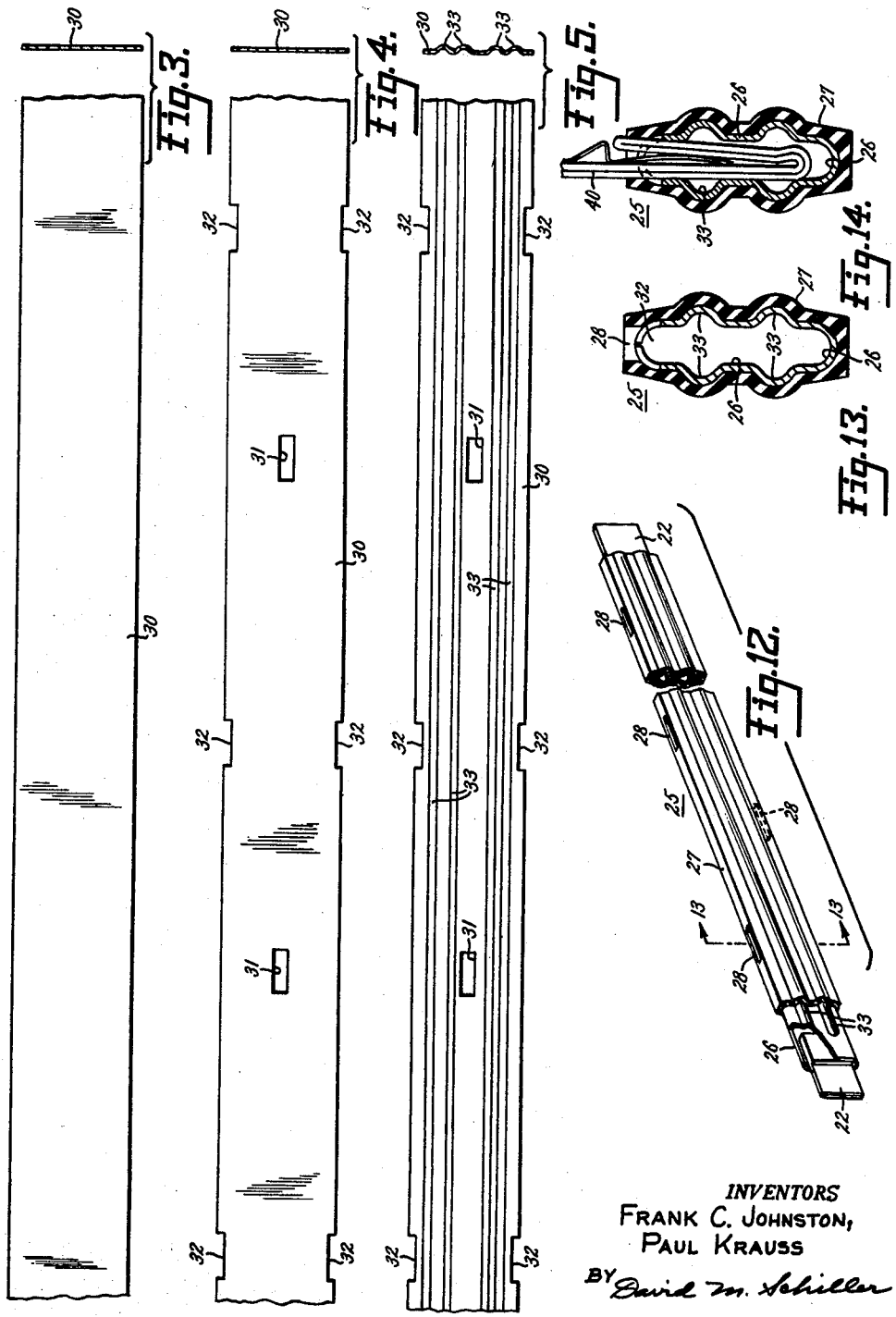

May 11, 1965   F. C. JOHNSTON ETAL   3,182,381
METHOD OF FORMING APERTURED HOLLOW INSULATED BUSBARS
Original Filed May 26, 1958   3 Sheets-Sheet 3
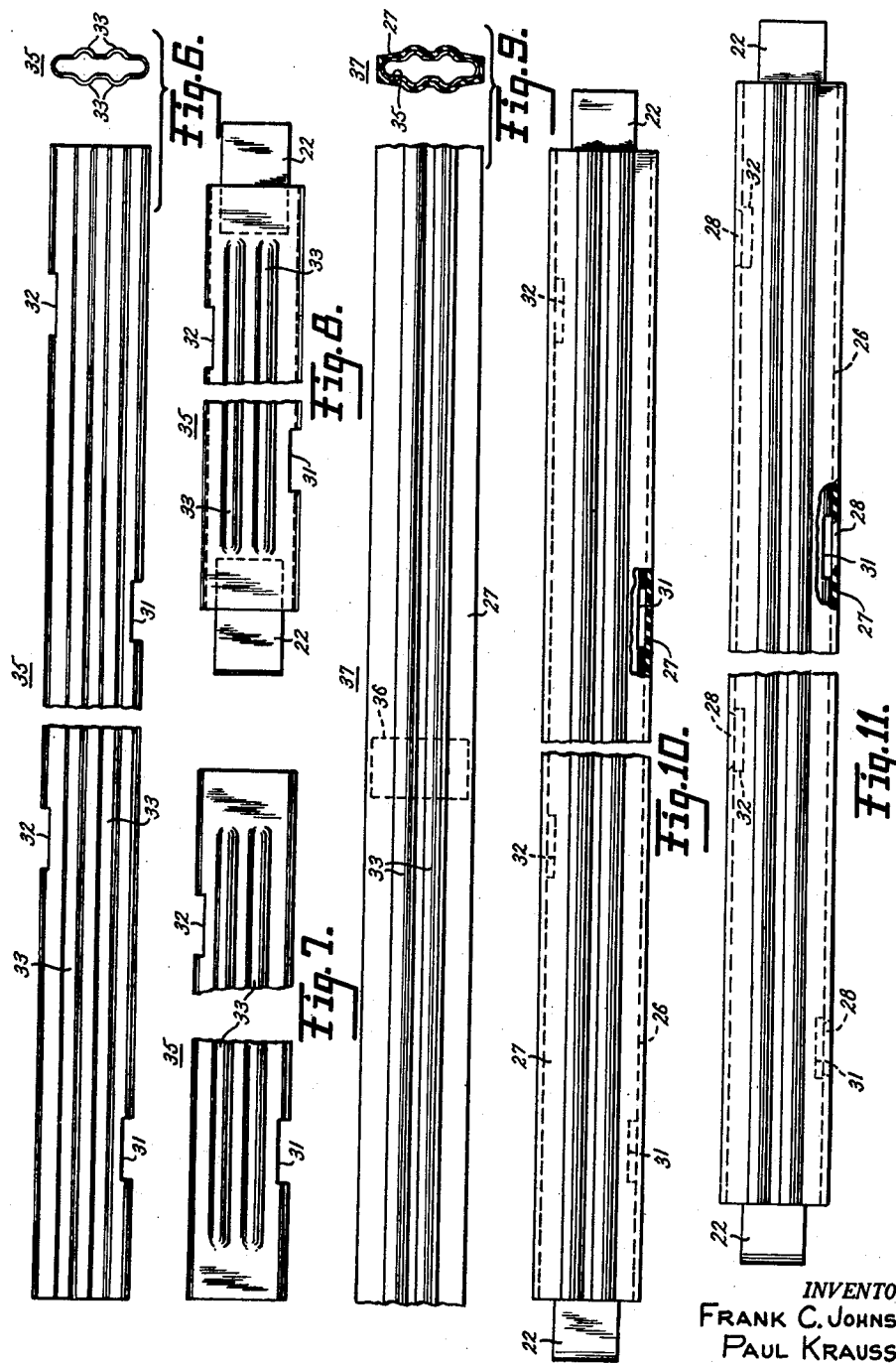
INVENTORS
FRANK C. JOHNSTON,
PAUL KRAUSS
BY David M. Schiller
ATTORNEY United States Patent Office 3,182,381
Patented May 11, 1965

3,182,381
METHOD OF FORMING APERTURED HOLLOW INSULATED BUSBARS
Frank C. Johnston, West Hartford, Conn., and Paul Krauss, Broomall, Pa., assignors to General Electric Company, a corporation of New York
Original application May 26, 1958, Ser. No. 737,954, now Patent No. 3,042,889, dated July 3, 1962. Divided and this application Apr. 16, 1962, Ser. No. 187,665
3 Claims. (Cl. 29—155.5)

This invention relates to methods of manufacturing electrical bus bar assemblies for busway systems and particularly to the manufacture of hollow bus bars apertured to receive plug-in connectors. This application is a division of our copending application Serial No. 737,954 filed May 26, 1958, now Patent No. 3,042,889, and entitled "Busway System."

Busways have heretofore been provided which include bus bar assemblies manufactured in various configurations for particular applications. In busway installations it is desirable to provide bus bars which are configured so as to facilitate connection thereof to bus bars of adjacent busway sections, and also to permit plug-in connection of current take-off devices to the bus bars. It is very desirable for several reasons that the bus bars be of hollow configuration having plug-in apertures opening into the interior of the bus bars and permitting stab connections to be made with the interior surfaces of the bars. Such hollow arrangement permits the entire outer surfaces of the bars to be shielded by insulation to provide a "dead front" construction. Also, with plug-in connections made inside of the bars rather than at the outside thereof there is no danger that the plug-in connectors will contact adjacent bus bars.

Previous methods employed to manufacture apertured hollow insulated bus bars have not been entirely satisfactory. For one thing, such methods have involved costly and time-consuming machining operations, such as boring and reaming solid conductor material, which have resulted in considerable waste of conductor material. Also, difficulties have been encountered in assembling connectors to the ends of the bars for the purpose of connecting the bars of adjacent busway sections. Further, the formation of plug-in openings in the bars and the insulation of the bars so that the plug-in openings are exposed through the insulation has heretofore created difficult problems. Thus prior art practice has been to (1) form a hollow busbar, (2) form apertures in the hollow busbar, (3) form an insulating sleeve or tubing, (4) form apertures in the insulating sleeve or tubing, and (5) put the insulating sleeve or tubing on the hollow busbar so that the apertures in the sleeve or tubing are aligned with the apertures in the busbar. A variation of this is to form an insulating sleeve or tubing, mount it on the hollow apertured busbar and then form the apertures in the tubing. Another variation has been to form a hollow tubing, form a coating of insulation thereon, such as by dipping or extrusion, and then to form apertures in both insulated bus bars such as by machining.

All of these prior art methods are relatively slow and expensive. Moreover, it is very difficult, if not impossible to form the openings in the insulation of slightly smaller size than the openings in the busbar, which is desirable to provide a dependable dead-front construction, i.e., one in which no busbar metal is directly exposed at the opening.

It is therefore a primary object of the present invention to provide a novel and improved method of forming apertured hollow insulated bus bars which involves a minimum number of rapidly and inexpensively performed operations and which avoids the waste of conductor material.

Another object of the invention is to provide a novel and improved method of forming hollow bus bars which involves simple and inexpensive operations performed on a strip of metallic material without wasting any material of the strip.

It is a further object of the invention to provide a novel and improved method of forming a hollow bus bar capable of receiving plug-in connectors and which involves rapid and inexpensive punching and bending operations performed on a strip of metallic material.

In carrying out the invention in one preferred form electrical bus bars are manufactured from a strip of thin, flat conductor material, such as aluminum. In performing the method, a strip of suitable length is initially passed through a punching machine which punches holes spaced longitudinally of the strip along the center line thereof and which also punches notches in the edges of the strip. The strip is then bent along its center line into the configuration of a tube with its opposed edges abutting so that the previously punched notches register to provide plug-in apertures along one edge of the tube, the previously punched holes being disposed along the opposite edge of the tube to provide additional plug-in apertures which are staggered relative to the registering notches. Metallic contact plugs are next partially inserted into the ends of the tube and are permanently secured thereto as by welding. The tube is next passed through a cross head extruding machine which applies thereto a coating of suitable insulation, such as butyl synthetic rubber material in a heated molten condition, and the insulating material is then cured in place on the tube by a suitable heating operation, such as by heating in live steam. After the insulation is cured, openings are formed therein at areas aligned with the plug-in apertures of the tube so that such apertures are exposed to receive plug-in connectors.

Other objects and advantages of the invention will become apparent from the following description taken in conjunction with the accompanying drawings in which:

FIG. 1 is a view in perspective of a bus bar assembly constructed according to the method of the present invention.

FIG. 2 is a schematic representation of apparatus for applying insulation to the bus bar assemblies.

FIG. 3 shows plan and end views of a metallic strip utilized to form the bus bars.

FIG. 4 shows plan and end views of the strip of FIG. 3 after the punching operation.

FIG. 5 shows plan and end views of the strip of FIG. 4 after reinforcing ribs are formed thereon.

FIG. 6 shows plan and end views of a tube formed by bending the strip of FIG. 5 along the longitudinal center line thereof.

FIG. 7 is a view in plan showing the tube of FIG. 6 with the reinforcing ribs flattened at the ends thereof.

FIG. 8 is a view in plan showing the tube of FIG. 7 with metallic plugs partially inserted and attached to the ends of the tube.

FIG. 9 shows plan and end views of a continuous member formed of a plurality of the tubes of FIG. 8 connected together and having a coating of insulation applied thereto.

FIG. 10 is a plan view showing an insulated tube after having been separated from the continuous member of FIG. 9.

FIG. 11 is a plan view showing the insulated tube of FIG. 10 with openings cut in the insulation in alignment with the apertures of the tube.

FIG. 12 is a view in perspective of a bus bar assembly formed by the method of the present invention and differing from the assembly of FIG. 1.

FIG. 13 is a view in section along the line 13—13 of FIG. 12, and

FIG. 14 is a view similar to FIG. 13 showing a plug-in connector inserted into the bus bar.

Referring now to the drawings, there is illustrated in FIG. 1 a bus bar assembly 20 of one form constructed according to the method of the present invention. The assembly 20 includes a bus bar 21 formed in the configuration of a hollow tube and constructed of a suitable electro-conductive material such as electrically conductive grade aluminum. Metallic plugs 22 are partially inserted into the ends of the bar 21 with portions thereof exposed to permit connection of the assembly 20 to other bus bar assemblies located in adjacent busway sections. The assembly 20 also includes insulation 23 substantially completely surrounding the bar 21 and having openings 24 spaced longitudinally along opposed edges thereof which are aligned with plug-in openings (not shown in FIG. 1) formed in the bar 21 as will presently appear. In FIG. 1 the insulation 23 is illustrated as extending short of the left hand end of the bar 21 to permit a showing of the plug 22 and part of the bar 21, but in practice the insulation 23 will extend the full length of the bar 21.

FIGS. 12-14 illustrate a bus bar assembly 25 of different construction than the assembly 20 manufactured according to the method of the present invention and requiring an additional step in the method employed to form the assembly 20. The assembly 25 includes a bus bar 26 of different construction than the bar 21 of the assembly 20, the plugs 22 in the ends of the bar 26, insulation 27 about the bar 26, and openings 28 in opposite edges of the insulation 27. The method will be described in connection with the assembly 25.

In accord with the present invention, the bus bar assemblies 20 or 25 are formed by a unique method which involves a minimum number of rapidly and inexpensively performed operations and which avoids the waste of relatively expensive conductor material. In general, the improved method involves the punching and the bending of a thin flat strip of suitable conductive material into a tube having longitudinally spaced apertures for receiving plug-in connectors which contact the interior of the tube. The tube is coated with insulating material and the finished insulating coating is cut at areas aligned with the plug-in openings of the conductive tube to expose such openings for receiving the plug-in connectors.

Referring now to FIG. 3 there is illustrated a thin flat strip 30 of conducting material, such as electrically conductive grade aluminum, from which the bus bars 26 are fabricated. The strip 30 is preferably of sufficient length so that a number of bus bars may be fabricated therefrom as will presently appear. The initial step in the preferred method of manufacture of the bus bar assemblies is the formation of a series of apertures 31 (FIG. 4) in the strip 30 at areas spaced longitudinally of the strip substantially along the center line thereof. This operation may be performed in any suitable manner such as by passing the strip 30 through a punching machine (not shown). The next step involves the formation of notches 32 (FIG. 4) along the edges of the strip 30 which notches are in alignment transversely of the strip length and are staggered with respect to the apertures 31. The notches 32 may conveniently be formed by the punching machine (not shown) during the punching of the apertures 31.

In one form of the invention the strip 30 in the form shown in FIG. 4 is next provided with two pairs of transversely spaced longitudinally extending reinforcing ribs 33 as shown in FIG. 5. The ribs 33 may conveniently be formed by passing the strip 30 in the configuration shown in FIG. 4 through suitable roll forming machinery (not shown). In the bus bar assembly 20 shown in FIG. 1 this step of the method is omitted and no reinforcing ribs are provided. However, this step is utilized in the manufacture of the bus bar assembly 25 illustrated in FIGS. 12-14. The strip 30 in the form shown in either FIG. 4 or FIG. 5 is next bent about its central longitudinal axis into the configuration of a tube 35 shown in FIG. 6. Such bending may be accomplished in any suitable manner, such as by passing the strip through additional roll forming machinery (not shown). During the bending operation, the opposed edges of the strip are moved into abutting relation so that the notches 32 register to thereby provide longitudinally spaced apertures in one edge of the tube which with the apertures 31 form two opposed sets of longitudinally-staggered plug-in apertures in opposite edges of the tube 35. It is noted with reference to FIG. 6 that the tube 35 is of noncircular cross section with the relatively short opposite edges thereof connected by longer side walls.

The tube 35 is next cut to standard lengths and the ends of the tube are modified by flattening the rib portions 33 adjacent the end portions of the tube as shown in FIG. 7. Following this operation the metallic plugs 22 are partially inserted into the ends of each length of tubing so that the ends of the plugs 22 are exposed as shown in FIG. 8. The plugs 22 are then permanently affixed to the tube length in any suitable manner such as by welding. The tube lengths are then coated with a plating of silver by a suitable process such as by the "modified zincate process."

The next step in the process is the application of suitable insulating material to the tube lengths. In order to accomplish this in a rapid and economical manner, the tube lengths are preferably arranged in end-to-end relation with the contact plugs 22 of one length overlapping with the contact plugs 22 of adjacent tube lengths and connected thereto by a connector 36 which lies even with the sides of the tube lengths as shown in FIGS. 2 and 9. This provides one continuous member 37 formed of connected tube lengths which may be conveniently passed through an extruding machine which applies a coating of insulating material to the member 37. In FIG. 2 the member 37 is shown passing in the direction of the arrow A through a "crosshead" extruding machine 38 which applies a coating 27 of suitable insulating material, such as butyl synthetic rubber material, to substantially the entire external surface of the member 37 and over the apertures 31 and 32. The insulating material is applied to the member 37 in a heated molten condition, the material being extruded through a die so that the outer configuration of the coating 27 is closely controlled although the material is applied in a molten condition and under some pressure, and although the apertures 31, 32 are left open during the extrusion process, it has been found that the material does not flow into the apertures. The coating is preferably applied so that the upper and lower edges thereof are flat. The coated member 37 emerges from the extruder 38 in one continuous line and the individual tube lengths are then separated (FIG. 10) and the insulating material is then cured in place on the tube lengths by a suitable heating process, such as by heating in live steam. In order to expose the plugs 22 the insulating coating is removed therefrom so that the coating extends only to the ends of the bars 26.

Following the complete curing of the insulating coating 27, the openings 28 are formed in the coating 27 at areas thereof in alignment with the apertures 31 and 32 formed in the tube lengths as previously described so that the apertures 31 and 32 are exposed for receiving plug-in connectors. The openings 28 may be formed in any suitable manner and are preferably of somewhat smaller size than the apertures 31 and 32 so that the insulating coating projects slightly beyond the edges of the apertures 31 and 32 to provide a "dead front" construction.

FIGS. 12 and 13 show the completed assembly 25 and in FIG. 14 there is shown a plug-in connector 40 extending through one of the apertures 32 of the bus bar and the associated opening 28 of the coating 27 into the interior of the bus bar.

While we have shown only certain specific embodiments of our invention, it will be readily apparent that many modifications thereof may readily be made by those skilled in the art, and we therefore intend by the appended claims to cover all such modifications as fall within the true spirit and scope of the invention.

What we claim as new and desire to secure by Letters Patent of the United States is:

1. The method of making an apertured hollow insulated busbar comprising the steps of extruding a coating of insulating material on an elongated hollow metallic member having a series of longitudinally spaced apertures therein, said coating of insulating material being extruded over said apertures, hardening said extruded coating, and removing said hardened coating at areas aligned with said apertures to expose said apertures.

2. The method of forming an apertured hollow insulated busbar comprising the steps of extruding a coating of insulating material on an elongated metallic member having a series of longitudinally spaced apertures therein, said coating being extruded over said apertures, heating said coated member to harden said coating thereon, and removing said hardened coating at areas aligned with said apertures to expose said apertures.

3. The method of making an apertured hollow insulated busbar comprising the steps of notching opposite side edges of an elongated metallic strip, forming said strip into an elongated tube by bending it about an axis parallel to its longitudinal edges until said opposed side edges abut each other and said notches register to provide an elongated tube having a series of longitudinally spaced apertures therein, extruding a coating of insulating material on said tube over said apertures, hardening said extruding coating, and removing said hardened coating at areas aligned with said apertures to expose said apertures.

References Cited by the Examiner
UNITED STATES PATENTS

| | | | |
|---|---|---|---|
| 2,054,703 | 9/36 | Little et al. | 113—33 |
| 2,120,150 | 6/38 | Marshall | 113—33 |
| 2,240,180 | 4/41 | Frank | 339—21 |
| 2,250,513 | 7/41 | Von Gehr | 339—21 |
| 2,343,232 | 2/44 | Togesen | 339—22 |
| 2,585,770 | 2/52 | Hammerly | 339—22 |

WHITMORE A. WILTZ, *Primary Examiner.*

JOHN F. CAMPBELL, *Examiner.*